United States Patent
Neumair

(10) Patent No.: US 7,367,355 B2
(45) Date of Patent: May 6, 2008

(54) TWIN MANIFOLD SEAT VALVE HAVING SOLENOID ACTUATION

(75) Inventor: Georg Neumair, Thalhausen (DE)

(73) Assignee: Hawe Hydraulik GmbH & Co., KG, Munich (DE)

( * ) Notice: Subject to any disclaimer, the term of this patent is extended or adjusted under 35 U.S.C. 154(b) by 261 days.

(21) Appl. No.: 11/055,319

(22) Filed: Feb. 10, 2005

(65) Prior Publication Data

US 2005/0178449 A1    Aug. 18, 2005

(30) Foreign Application Priority Data

Feb. 13, 2004  (DE) .................. 20 2004 002 268 U

(51) Int. Cl.
*F15B 13/044*    (2006.01)
(52) U.S. Cl. .............. 137/596.17; 137/595; 137/596.1; 137/597; 251/239
(58) Field of Classification Search ............... 137/309, 137/596.1, 596.17, 597, 625.65, 625.27, 137/595; 251/129.2, 244–246; 91/465
See application file for complete search history.

(56) References Cited

U.S. PATENT DOCUMENTS

| | | | | |
|---|---|---|---|---|
| 537,545 | A | * 4/1895 | McKenna | .............. 251/98 |
| 2,051,938 | A | * 8/1936 | Carlson | .............. 251/50 |
| 2,300,263 | A | * 10/1942 | McLeod | .............. 91/465 |
| 2,600,872 | A | 6/1952 | Henriksen | |
| 2,758,447 | A | * 8/1956 | Prosek | .............. 62/234 |
| 2,850,258 | A | 9/1958 | Lazich | |
| 3,203,446 | A | * 8/1965 | Smirra | .............. 137/595 |
| 3,683,962 | A | * 8/1972 | Good | .............. 137/868 |
| 4,694,862 | A | * 9/1987 | Rott | .............. 137/625.5 |
| 6,126,046 | A | * 10/2000 | Baculy | .............. 222/505 |

FOREIGN PATENT DOCUMENTS

| | | |
|---|---|---|
| DE | 198 33 744 C | 11/1999 |
| EP | 1 036 965 A | 9/2000 |
| EP | 1 039 182 A | 9/2000 |

OTHER PUBLICATIONS

European Search Report for German Patent Application No. DE 02004002268, dated Sep. 16, 2004.

* cited by examiner

*Primary Examiner*—John Rivell
*Assistant Examiner*—Craig Price
(74) *Attorney, Agent, or Firm*—Cook, Alex, McFarron, Manzo, Cummings & Mehler, Ltd.

(57) ABSTRACT

A twin manifold seat valve comprising at least two closure members S1, S2, S3 each functionally associated with at least one valve seat D1, D2, D3, D4. At least one of the closure members is moved to a blocking position with predetermined blocking force at the valve seat upon energization of a solenoid and counter to the force of a spring 22, 7. A single common solenoid M is functionally associated to both closure members S1, S2, S3 by two pivotably supported reduction levers U1, U2. The armature 2 of the solenoid actuates both reduction levers U1, U2. The closure members are located on the same side of the pivot support of the reduction levers. A spring member is integrated into at least one of the reduction levers. The solenoid armature deforms the spring members to generate the closure member blocking force by moving the closure members into contact with their respective seats.

7 Claims, 3 Drawing Sheets

Figure 2:
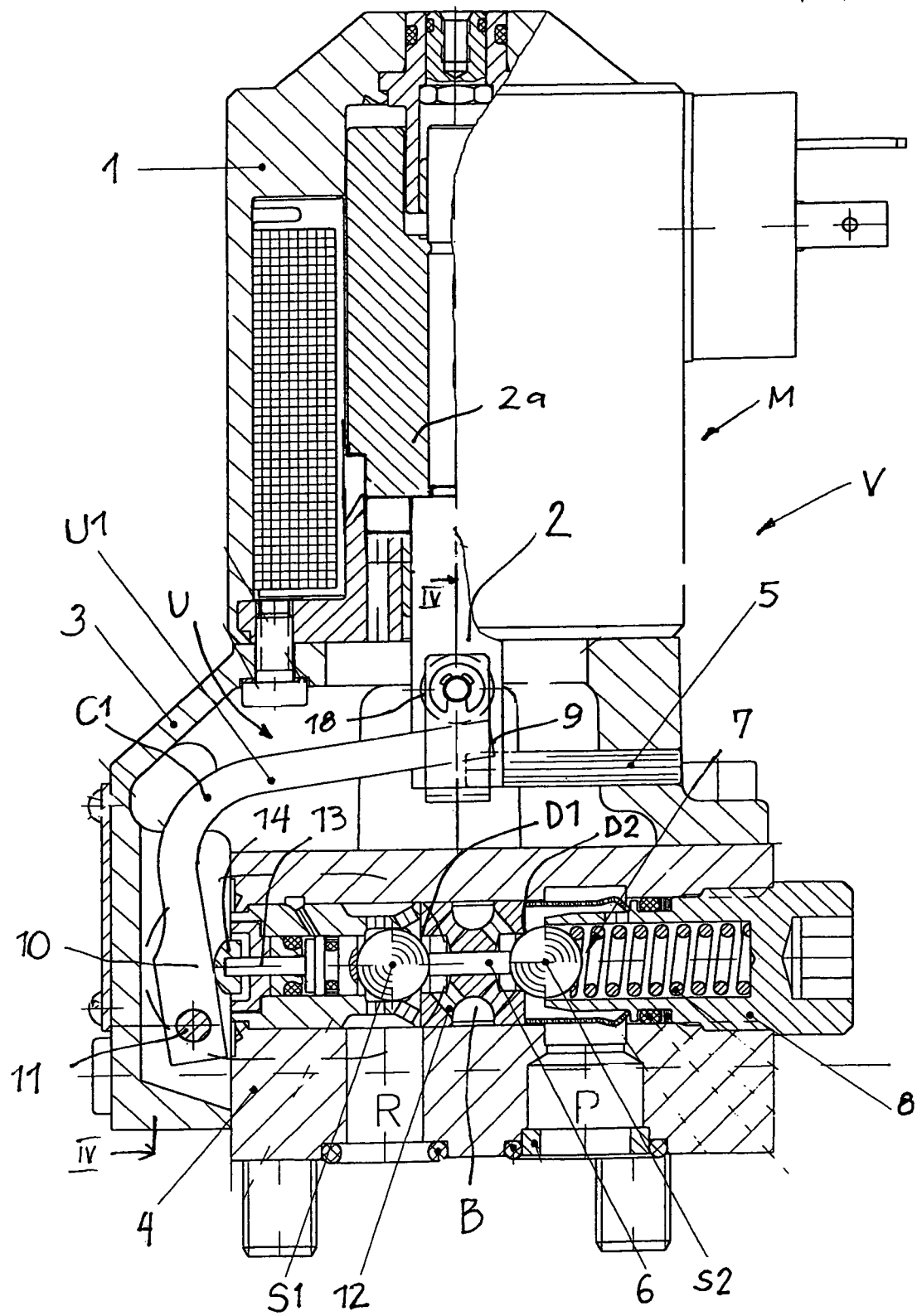

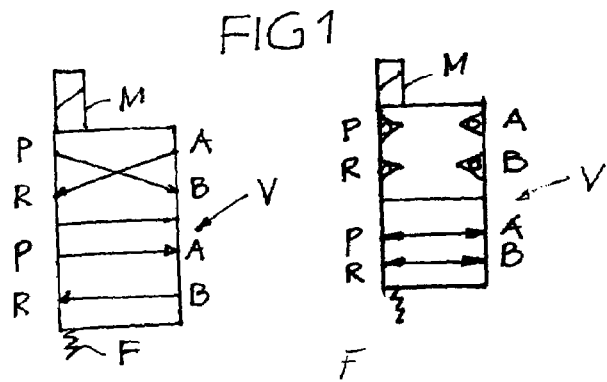
FIG 1
FIG 3
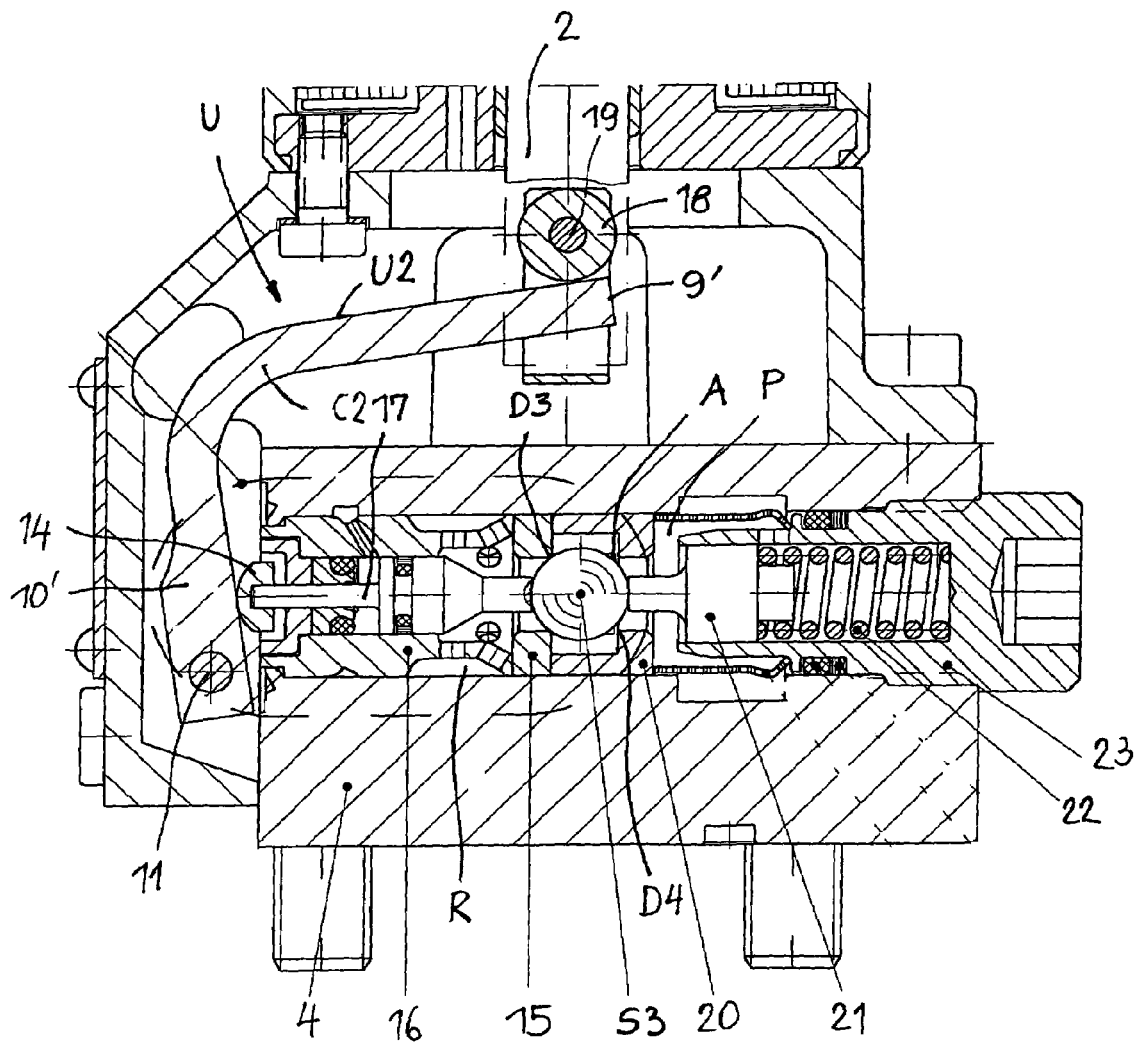

TWIN MANIFOLD SEAT VALVE HAVING SOLENOID ACTUATION

The invention relates to a twin manifold seat valve according to the preamble of claim 1.

In case that for a twin manifold seat valve, e.g. a 4/2 or 4/3 solenoid seat valve, as is known in practice, the solenoid force is used in order to bring both closure members via the reduction levers into the blocking positions on the seats and to hold them in the blocking position with a predetermined blocking force a separate solenoid is needed for each closure member, since a common solenoid is unable to reliably and simultaneously assure the blocking positions or the blocking forces for both closure members. The reason for this drawback is that the blocking positions due to tolerances may differ from each other such that in case of a common single solenoid one closure member would not reach the blocking position correctly. Only when two closure members are moved by a solenoid force counter to spring force from the blocking positions into the opening positions a common solenoid can be used which actuates both closure members by means of two separated rigid reduction levers or a single rigid unitary twin-reduction lever, respectively, because the opening positions of both closure members merely will result from a balance between the spring force and the solenoid force.

EP 1 036 965 B discloses a valve combination comprising two 4/2 manifold seat valves and a common solenoid which actuates both closure members by means of a balancing element with the shape of an arm of a balance. The common solenoid displaces the closure members counter to spring force from the blocking positions until an equilibrium is achieved between the solenoid force and the spring force, or, until in some cases the armature reaches the stroke end, respectively.

Of interest are furthermore: U.S. Pat. No. ,600,872 A, EP 1 039 182 A, DE 198 33 744 C, U.S. Pat. No. 2,850,258 A.

It is an object of the invention to provide a twin manifold seat valve of the type as mentioned above which is structurally simple although the solenoid function is used to adjust at least one closure member into the blocking position.

This object is achieved by the features of claim 1.

The spring member which is deformed between the solenoid and the closure member reliably defines the blocking position and the blocking force of the closure member which is brought by the solenoid in to the blocking position and independent therefrom what is happening with the other closure member. As, despite the closure function of the common solenoid for both closure members, not only the solenoid force is used to adjust respective blocking positions or to generate the respective blocking force but also the spring member within the kinematic chain, the blocking position and the blocking force may be selected individually for each closure member, provided that the solenoid force is larger than the sum of the deforming force of the at least one spring member. In the case that both closure members are brought by the solenoid in to their blocking positions, then, in some cases, finally both spring members will be deformed such that each spring member adjusts the blocking position of the closure member which is associated with this spring member, and also the necessary blocking force. In most cases, anyhow, the closure members are pressure balanced with respect to the prevailing pressure. In this way despite the single common solenoid each closure member can be actuated individually. A single solenoid for the one or for both blocking functions, respectively means a considerable structural simplification in comparison to such valves having two solenoids for the same purpose.

The above-mentioned structural concept is particularly expedient when both closure members of both valves substantially at the same time are brought by the solenoid into the blocking positions.

Expediently, the spring member is directly integrated into the reduction lever, e.g. in the form of a rated bending point where the reduction lever is bent as soon as the solenoid has fully pulled through. Since theoretical valve applications exist where only one closure member has to be brought into the blocking position, then the other closure member which is adjusted counter to spring force by the deformed spring element will achieve the opening position due to a force equilibrium between the spring and the spring member. In some cases then even a spring member could be dispensed with for the closure member which is brought by the solenoid into the opening position.

In another expedient embodiment a separate spring member may be provided between the armature actuation end of the reduction lever and the armature or between the closure member actuating end of the reduction lever and the closure member itself, respectively. The function then would be the same. In this case the reduction levers could be formed rigid such that they will not be bent themselves.

Two separate reduction levers are advantageous since then the respective deformation of the spring members do not influence each other. However, it is possible to form both reduction levers as a single twin-reduction lever comprising one armature actuation end and two closure member actuation ends, which, e.g., branch apart like a fork. The respective spring member here could be integrated into one fork tine, or could, as mentioned, be provided between the closure member actuation end and the closure member.

In order to assure favourable force transmitting relations it is expedient to provide an abutment between a roller supported at the armature and the armature actuation end of the reduction lever.

If both closure members are actuated by means of rams a sliding cap on each ram may be advantageous in view of correct force transmitting relations. The sliding cap abuts at the closure member actuating end of the respective reduction lever.

In a simple embodiment operating with relatively strong reduction of the solenoid stroke to the closure member stroke, e.g. within a range of about 1:5, each reduction lever is structured with the shape of an L and with a cross-section which is larger in the region of the pivot support of the reduction lever and at the closure member actuating end than in the further course of the reduction lever. By this measure a sort of a bending spring having a predetermined spring rate may be provided within the further course of the reduction lever.

Normally, both spring members may have the same spring rates. However, since in some cases the closure members need different blocking forces, or when only one closure member needs a predetermined blocking force derived from the solenoid force, then the spring rates of the spring members even may be selected differently from each other.

Figure 4:
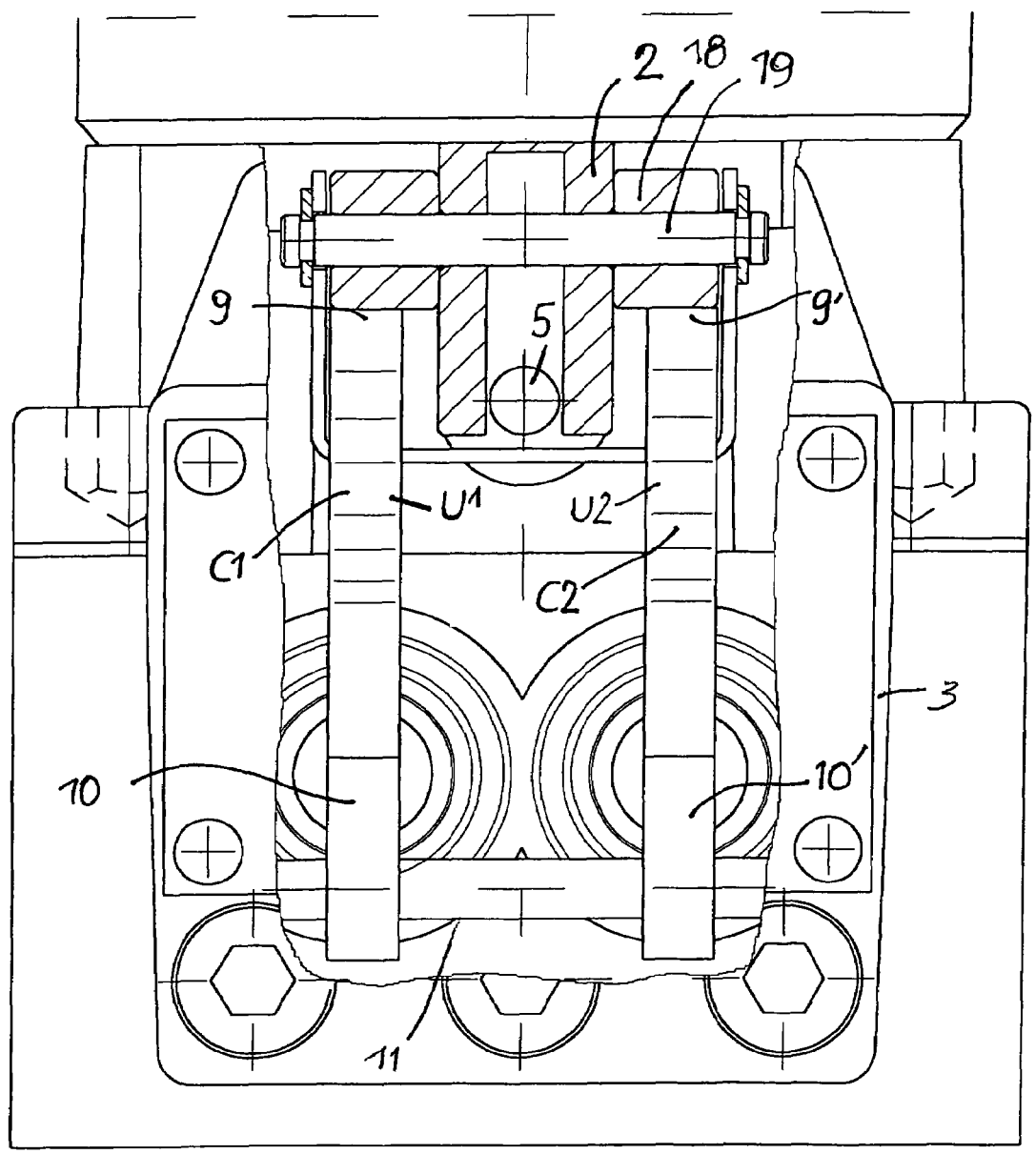

Embodiments of the invention will be explained with the help of the drawings. In the drawings is:

FIG. 1 is a not limiting selection of twin manifold seat valves having a solenoid actuation two 4/2 solenoid seat valves in symbolic illustration, each having a single solenoid, and in de-energised state, FIG. 2 a vertical partial section of a 4/2 solenoid seat valve, broadly corresponding to the left-hand illustration in FIG. 1, shown in a concise construction, with the section plane in the moving plane of one closure member, FIG. 3 a section similar to FIG. 2 in a section plane of a second closure member, and FIG. 4 a sectional illustration along the section plane IV-IV in FIG. 2.

The left and right symbolic illustrations of 4/2 solenoid seat valves V in FIG. 1 are a selection out of several possibilities of designs and functions of such twin manifold seat valves with solenoid actuation. In the left symbolic illustration in FIG. 1 the 4/2 solenoid seat valve V has a single solenoid M operating counter to the force of a spring F. The solenoid M switches the valve V from one switching position adjusted by the spring F (the pressure side P is communicating with the consumer side A, the consumer side B is communicating with the return side R) into the other switching position (the pressure side P is communicating with the consumer side B, the consumer side A is communicating with the return side R).

The solenoid M in the symbolic illustration on the right side in FIG. 1 is provided to switch the valve V from the one switching position adjusted by the spring F (the pressure side P is communicating with the consumer side A, the consumer side B is communicating with the return side R) into the other switching position (the pressure side P is separated from the consumer side A, the consumer side B is separated from the return side R).

Although the solenoid M serves in both 4/2 solenoid seat valves which are shown symbolically as a selection in FIG. 1 to bring at least one closure member or even both closure members into the blocking position and to generate in the blocking position a predetermined blocking force, nevertheless only a single and common solenoid M is provided.

FIGS. 2 to 4 illustrate the interior structure of a twin manifold seat valve, e.g. of the 4/2 solenoid seat valve V according to the left symbolic illustration of FIG. 1.

In FIGS. 2 and 3 the solenoid M is secured with a housing 1 on an intermediate housing 3 which is fixed at a valve housing 4. The solenoid M includes an armature 2 which is connected to a movable core 2a. The armature 2 is adjustable from the shown upper end position in FIG. 2 downwardly and then generates a predetermined solenoid force. A pin 5 is arranged within the intermediate housing 3. The pin 5 serves as an anti-rotation means for the armature 2. In the sectional illustration in FIG. 2 a ram 6 is inserted between two closure members S1, S2 which are formed as balls. Both closures members S1, S2 are loaded by a respective spring 7 in FIG. 2 to the left side (function of the spring F in FIG. 1). The spring 7 is supported at a screwed-in nut 8.

The movement of the armature 2 is transmitted via a reduction lever U1 of a reduction lever assembly U to both closure members S1, S2. The reduction lever U1 has an armature actuation end 9 and abuts with the armature actuation end 9 at a roller 18 which is supported by a pin 19 at the armature 2 (FIG. 4), and a closure member actuating end 10 which is situated close to a pivot support having a pivoting axis 11 in the intermediate housing 3. A sliding cap 14 is put on a ram 13 which acts on the one closure member S1 of both closure members S1, S2. The sliding cap 14 abuts at the closure member actuating end 10. At least one valve seat is associated to each closure member. In particular the valve seat D1 is associated to the closure member S1. The valve seat D2 is associated to the closure member S2. The valve housing 4 has a port R connected to the return side and a port P connected to the pressure side. A consumer side B is located therebetween. The consumer B can be pressurised via inclined bores 12 from the valve seats D1, D2. The valve seat D1, thus, is arranged between the return side R and the consumer B, while the valve seat D2 is located between the consumer side B and the pressure side P.

The reduction lever U1 is structured in the region of the closure member actuating end 10 and at the pivot support 11 with a larger cross-section than within the further course up to the armature actuation end 9. Into this further course a spring member C1 is integrated in the reduction lever U1 like a sort of a bending spring having a predetermined spring rate or spring characteristic.

In the shown one switching position in FIG. 2 the closure member S2 is pressed by the spring 7 against the valve seat D2 while the closure member S1 is lifted from its valve seat D1. As a result, the pressure side P is separated from the consumer side B, while the consumer side B is communicating with the return side R.

Upon energization of the solenoid M the armature 2 is moved downwardly, and in particular further downwardly, as is necessary, e.g. for the closure member S1 to reach the blocking position. The reduction lever U1 reduces the armature stroke into a shorter closure member stroke such that the force acting on the closure member S1 is increased. The ram 13 moves the closure member S1 in to the blocking position on the valve seat D1 and maintains in the blocking position a predetermined blocking force. At the same time the closure member S2 is lifted from the valve seat D2. Then the consumer side B is separated from the return side R and is connected via the valve seat D2 with the pressure side P. The blocking force is larger than the force of the spring 7. The closure member S1 is pressure balanced in the blocking position. The solenoid force and the spring rate of the spring member C1 e.g. are selected such that the spring member C1 is deformed when the blocking position of the closure member S1 is reached.

In FIG. 3 in a section similar to the section as shown in FIG. 2 a further closure member S3 can be seen in the valve housing 4. The closure member S3 selectively co-acts with one of two opposite valve seats D3, D4 in order to block in the respective blocking position and with predetermined blocking force the communication from the consumer side A opening out between the valve seats D3, D4 to either the return side R or to the pressure side P, respectively. The valve seat D3 is formed in an inserted ring 15, while the valve seat D4 is formed in a sleeve insert 20. A ram 17 for moving the closure member S3 is slidingly guided in a guiding sleeve 16. The ram 17 is sealed and carries at one end a sliding cap 14 abutting at a closure member actuating end 10' of second reduction lever U2 which is pivotably supported in the pivot support 11 of the intermediate housing 3 and which abuts with its armature actuation end 9' at the roller 18 of the armature 2. The reduction lever U2 may, analogously to the reduction lever U1, be equipped with an integrated spring member C2, which may be a sort of a bending spring. However, it is possible to define the blocking position of this closure member S3 by the solenoid M only and to omit the spring member C2. The closure member S3 is actuated via a piston 21 in a direction towards the valve seat D3 by a spring 22 (spring function F in the symbolic illustration on the left side in FIG. 1). The closure member S3 maintains in case of the de-energized solenoid M the other blocking position with the blocking force generated by the spring 22. The spring 22 is supported at a spring support 23. The return side R then is separated from the consumer side A, while the consumer side A is connected via the valve seat D4 with the pressure side P When the solenoid M is energized the armature 2 is moved downwardly. The reduction lever U2, which, e.g., has a reduction ratio of about 1:5, preferably 1:4.46, lifts the closure member S3 from the valve seat D3 and brings the closure member S3 to the blocking position on the valve set D4 and generates and maintains a predetermined blocking force. Now the consumer side A is connected to the return side R, while the pressure side P is blocked versus the consumer side A. The reduction lever U2 has to overcome the force of the spring 22. The pressure at the pressure side P acts on the closure member S3 but is balanced at the closure member S3. In the blocking position of the closure member S3 at the valve seat D4 the armature 2 has at least reached about the stroke end position. Provided that the spring member C2 is present in the reduction lever U3 the spring member C2 will then be deformed.

In FIG. 4 both rollers 18 are supported on the pin 19 in the armature 2. The armature actuation ends 9, 9' of both reduction levers U1, U2 abut at the rollers 18 while the closure member actuating ends 10, 10' are aligned with the rams 13, 17 which cannot be seen in the view of FIG. 4. The axis 11 in the intermediate housing 3 is provided for both reduction levers U1, U2. The anti-rotation pin 5 of the armature 2 engages into a longitudinal slot in the armature.

Different from the shown embodiment both reduction levers U1, U2 even may be combined in a twin-reduction lever which then has a single armature actuation end and two closure member actuating ends. Such a twin-reduction lever could be formed like a fork and then could have an integrated bending spring defining the spring member C1 and/or C2, respectively in at least one fork tine.

Furthermore, it is possible, different from the shown embodiment, to provide the respective spring member C1, C2 separately and to arrange it either between the armature actuation end and the armature or between the closure member actuating end and the closure member. Then the function would be the same.

The invention claimed is:

1. Twin manifold seat valve, including at least two closure members (S1, S2, S3) each being structurally associated with at least one valve seat (D1, D2, D3, D4), a single common solenoid (M) functionally associated with said at least two closure members, two reduction levers (U1, U2) each being supported in a pivot support (11), said reduction levers (U1, U2) being functionally provided between an armature (2) of the solenoid (M) and said at least two closure members, each closure member being loaded by the force of a spring (7, 22) to act in a direction against the respective reduction lever, each of said at least two closure members being moved in energized condition of the solenoid by a respective reduction lever from a first predetermined position relative to its said valve seat into a second predetermined position in mechanical engagement with its said valve seat, wherein said at least two closure members (S1, S2, S3) are positioned relative to said pivot support (11) of the reduction levers (U1, U2) such that said at least two closure members (S1, S2, S3) move at the same time in the same direction of movement as said two reduction levers (U1, U2) are moved, wherein upon energization of the solenoid (M) at least one of the at least two closure members is brought by a respective reduction lever into the second predetermined position and held with a predetermined blocking force at its seat, wherein a spring member (C1, C2) is integrated into at least one of the two reduction levers (U1, U2), and wherein said spring member (C1, C2) in said energized condition of said solenoid (M) and in said predetermined second position of said at least one of the two closure members is deformed by said solenoid force and generates the predetermined closure member blocking force for its closure member.

2. Twin manifold seat valve according to claim 1, wherein a separate spring member (C1, C2) is functionally integrated in each reduction lever (U1, U2).

3. Twin manifold seat valve according to claim 1, wherein the spring member (C1, C2) is integrated into the reduction lever (U1, U2) between an armature actuation end (9, 9') and a closure member actuating end (10, 10') of the reduction lever.

4. Twin manifold seat valve according to claim 1, wherein both reduction levers (U1, U2) form a twin reduction lever having a single armature actuation end and two closure member actuating ends.

5. Twin manifold seat valve according to claim 3, wherein the armature actuation end (9, 9') abuts at a roller (18) supported at the armature (2).

6. Twin manifold seat valve according to claim 1, wherein the at least two closure members (S1, S2, S3) are actuated by rams (13, 17) which carry sliding caps (14) for abutment of the reduction levers (U1, U2).

7. Twin manifold seat valve according to claim 3, wherein the reduction lever (U1, U2) is of L-shape and has a larger cross-section in a region of the pivot support (11) and of the closure member actuating end (10, 10') than in a further lever portion extending between the closure member actuating end (10, 10') and the armature actuation end (9, 9'), the spring member (C1, C2) being a bending spring integrated into the further lever portion.

* * * * *